Feb. 20, 1940.  A. M. ROSSMAN  2,190,952

ELECTRIC SWITCHGEAR

Filed Aug. 23, 1937  4 Sheets-Sheet 1

INVENTOR.
Allen M. Rossman
BY Morris Spector
ATTORNEY.

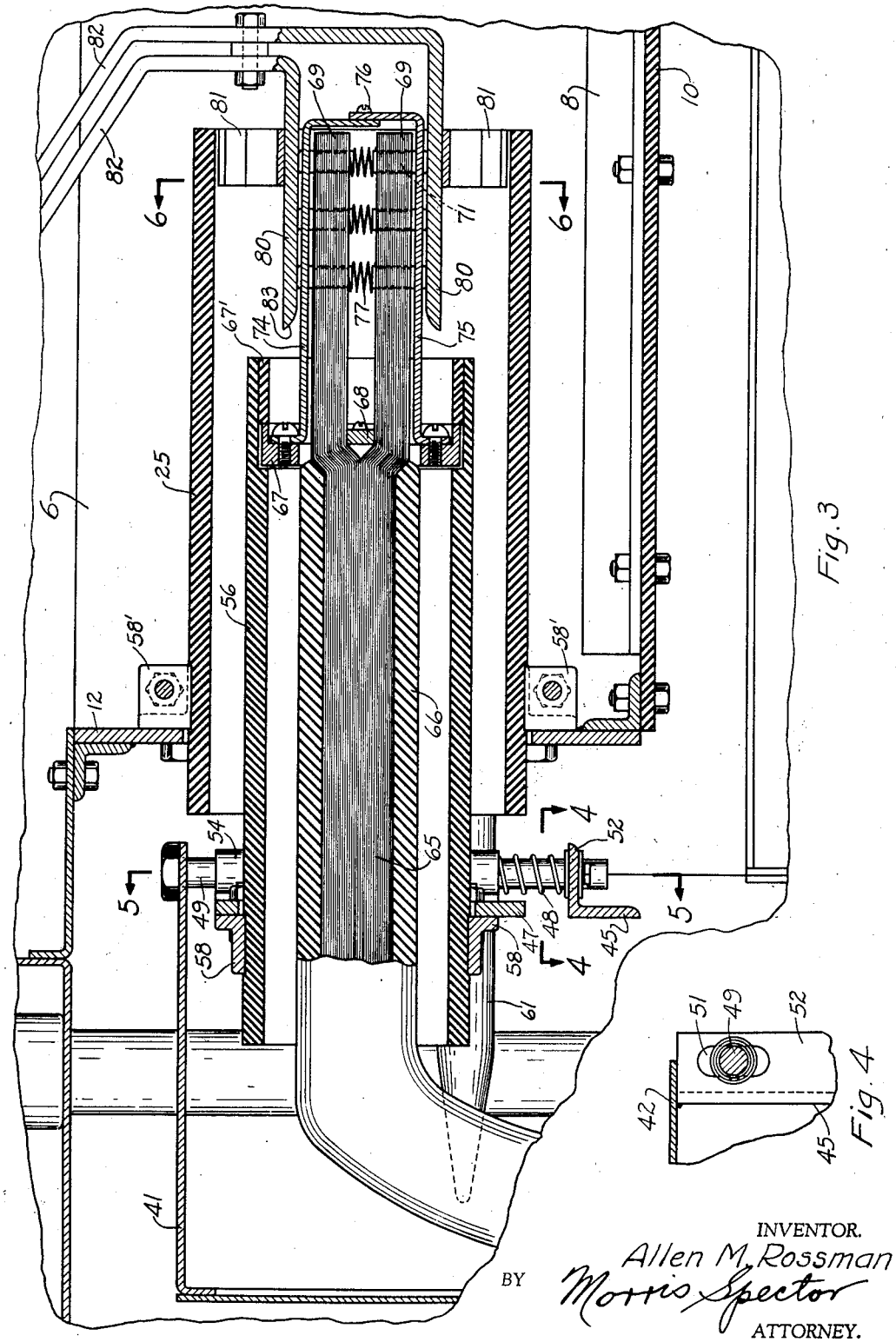

Feb. 20, 1940.  A. M. ROSSMAN  2,190,952
ELECTRIC SWITCHGEAR
Filed Aug. 23, 1937  4 Sheets-Sheet 3
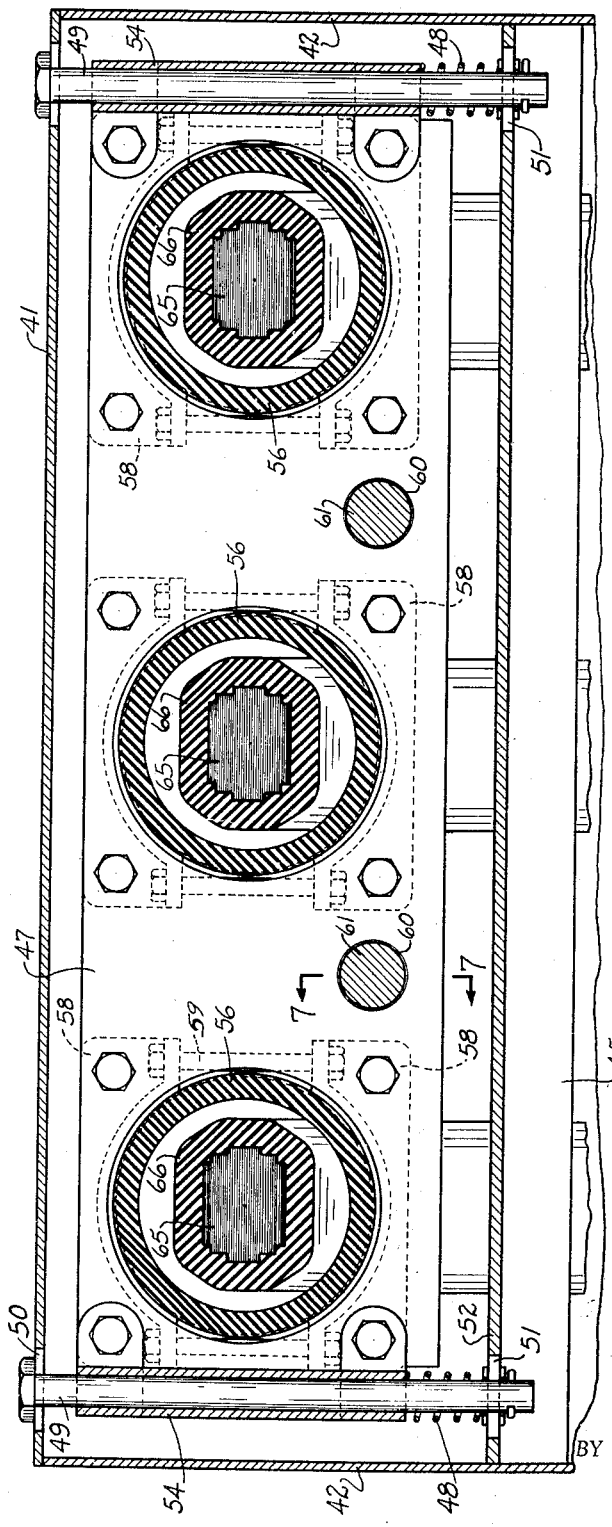
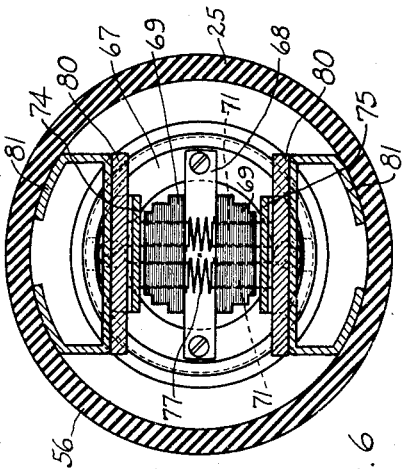
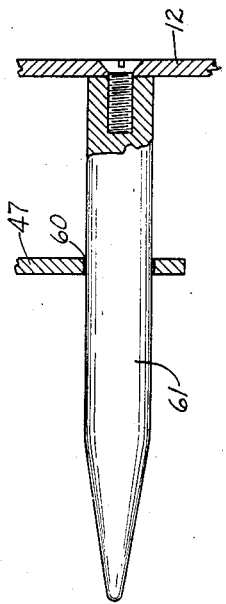
INVENTOR.
Allen M. Rossman
BY Morris Spector
ATTORNEY.

Feb. 20, 1940.　　　A. M. ROSSMAN　　　2,190,952
ELECTRIC SWITCHGEAR
Filed Aug. 23, 1937　　　4 Sheets-Sheet 4
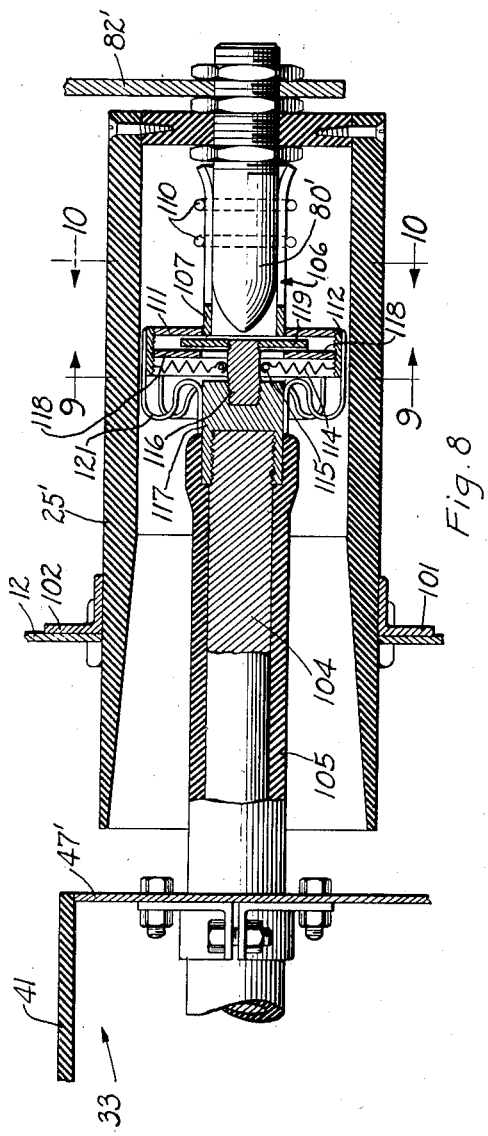
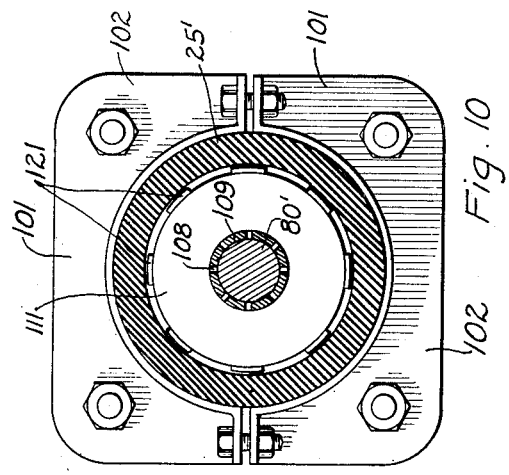
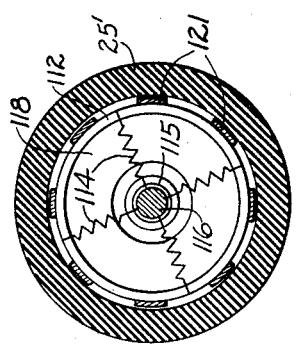
INVENTOR
Allen M. Rossman
BY Morris Spector
ATTORNEY Patented Feb. 20, 1940

2,190,952

UNITED STATES PATENT OFFICE 2,190,952

ELECTRIC SWITCHGEAR

Allen M. Rossman, Wilmette, Ill.

Application August 23, 1937, Serial No. 160,521

18 Claims. (Cl. 175—298)

This application is a continuation in part of my pending application Serial No. 117,827, filed December 28, 1936.

This invention relates to electric switchgear of the type wherein a circuit breaker is moved bodily into and out of its operative position and wherein the circuit breaker disconnecting operation is effected by the bodily movement of the circuit breaker. In its more particular aspects this invention relates to the disconnecting switching arrangement for connecting the breaker with the circuit as the breaker is moved into its operative position.

Switchgear of the type here involved includes a circuit breaker structure which is movable into its operative position and includes disconnecting switch contacts that are adapted to connect with cooperating contacts carried by the stationary structure. In order to obtain proper engagement of the cooperating contacts it is necessary that they be properly aligned as the breaker moves into position. This has, heretofore, necessitated the accurate alignment of the movable structure with respect to the stationary structure, the obtaining of which required accurate or precision machining which, of course, is costly. It is an object of the present invention to provide for the movement of the cooperating contacts into accurate alignment as the circuit breaker is moved into position even though the movable structure itself is not accurately positioned in the stationary structure. The above result is obtained by mounting the contacts of the stationary structure or of the movable structure on a floating support and providing means for moving the contact support by movement of the circuit breaker to bring the cooperating contacts into alignment. Individual floating supports may be provided for one of each pair of cooperating contacts, as disclosed in my pending application above referred to, or one floating support may be provided for a plurality of contacts on the stationary or movable structure, as herein further set forth.

It is a still further object of the present invention to provide a polyphase disconnecting switch, particularly adapted for use in a switchgear, wherein the cooperating contacts are brought into alignment in group formation, and thereafter the cooperating switch contacts are brought into alignment individually. By reason of the first adjustment the need for extreme accuracy or precision in mounting the circuit breaker disconnect contacts in the cell is obviated as above set forth. By reason of the added individual contact adjustment feature it becomes unnecessary to space the disconnect contacts that are on the circuit breaker structure in precisely the same relative spacing as the spacing of the cooperating contacts on the stationary structure. The need for extreme accuracy or precision is obviated because of the individual contact adjusting feature.

It is another object of this invention to provide a self-aligning arrangement for the cooperating contacts in a switchgear of the above character wherein the contacts themselves are not relied upon to effect the aligning movement. By the present invention the contacts are brought into alignment before they are brought into engagement thus relieving the contacts themselves of mechanical stress incident to the effecting of the aligning movement.

It is a further object of the present invention to provide a disconnect contact carrying structure that may be secured to the head of a circuit breaker and connected to the power terminals thereof, with the disconnect terminals arranged to cooperate with corresponding terminals of the stationary structure. Such a contact carrying structure permits the use of different designs of circuit breakers in one switchgear structure.

It is a still further object of the present invention to provide a switchgear of the above mentioned type wherein the floating self-aligning contact structure is provided on the movable circuit breaker structure thereby facilitating inspection and repair of the same when the breaker is moved out of its operative position.

It is a further object of the present invention to provide a switchgear of the above character wherein the circuit breaker structure is provided with wheels to facilitate movement of the same into position and wherein the disconnecting switch contacts are brought into alignment as the circuit breaker approaches its operative position, so that the circuit breaker structure may be wheeled as a unit into operative position without the necessity of accurate positioning of the circuit breaker structure in the stationary structure.

The attainment of the above and further objects of the present invention will be apparent from the following specification taken in conjunction with the accompanying drawings forming a part thereof.

In the drawings:

Figure 3 is an enlarged view of one of the circuit breaker disconnecting switch contacts of Figure 1;

Figure 4 is a fragmentary sectional view taken along the line 4—4 of Figure 3;

Figure 5 is a sectional view taken along the line 5—5 of Figure 3;

Figure 6 is a sectional view taken along the line 6—6 of Figure 3;

Figure 7 is a fragmentary sectional view taken along the line 7—7 of Figure 5;

Figure 8 is a fragmentary sectional view of a switchgear employing a different disconnecting switch and showing a section through the switch;

Figure 9 is a sectional view taken along the line 9—9 of Figure 8; and

Figure 10 is a view taken along the line 10—10 of Figure 8.

Figure 1:
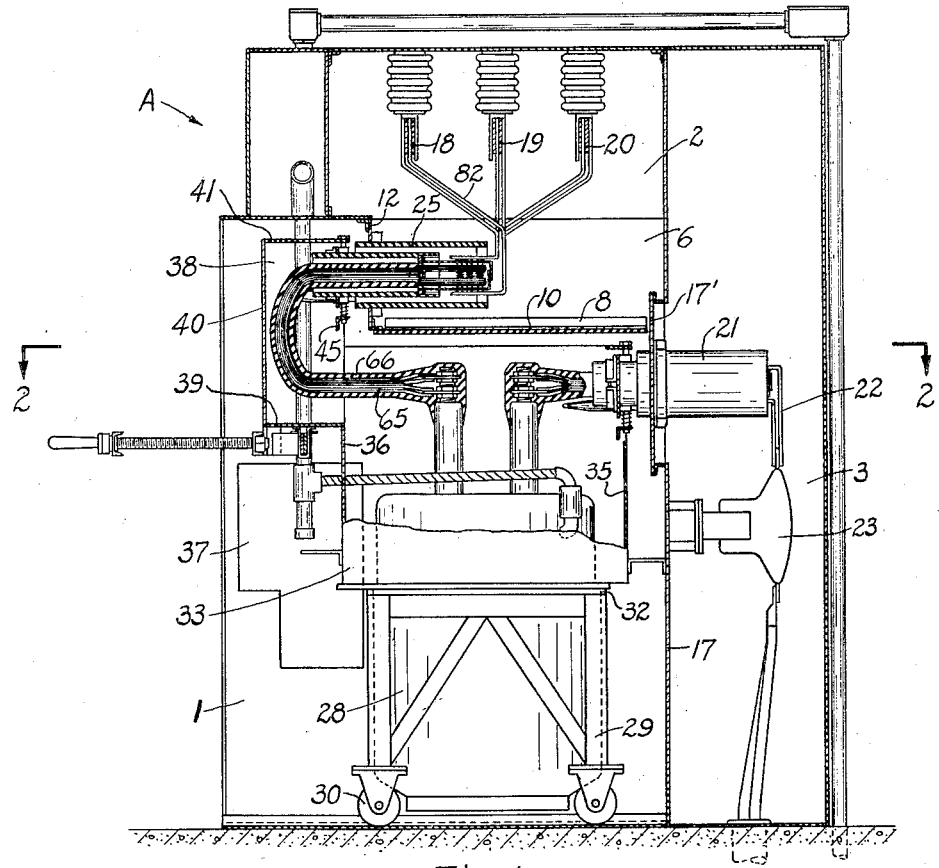
Figure 1 is an elevational view, in partial section, of a switchgear constructed in accordance with the teachings of the present invention.

Reference may now be had more particularly to the structure illustrated in Figures 1 to 6 inclusive. The switchgear here shown comprises a stationary structure having a lower compartment into which the circuit breaker is movable horizontally to establish circuit connections through a circuit breaker. Above the circuit breaker compartment is a busbar compartment, and to the rear of the circuit breaker compartment is a compartment for housing the incoming or outgoing circuit conductors or lines, the arrangement being such that the incoming line can extend to the switch housing from an upwardly or a downwardly direction, all as shown and illustrated in my pending application, Serial No. 117,827, filed December 28, 1936. A plurality of units "A" such as is shown in Figure 1 are placed side by side, depending upon the number and kind of circuits at the station, so that the busbar compartments of the respective cells are in alignment. Busbars extend through the respective aligned cells in the form of bars running from cell to cell. If desired, insulating barriers may be placed between the busbar compartments of adjacent cells and those barriers may be made to support the busbars. The stationary structure includes a circuit breaker compartment 1, a busbar compartment 2, and a current transformer compartment 3, into which the incoming or outgoing lines are extended. The stationary structure is made mainly of sheet metal, with suitable insulating sheets at the desired places, although it is to be understood that the structure may be made of non-metallic material.

The circuit breaker compartment 1 has two sheet metal sides 6—6 and a metal back 17. Each of the sides 6—6 comprises a sheet metal plate the front and rear edges of which are turned inwardly to form vertical flanges. Angle iron strips 8 are secured to the inner side of each sheet 6 adjacent the top portion thereof. These strips serve as supports to which is bolted an insulating cover or barrier 10 for the circuit breaker compartment, which cover is also the lower wall of the busbar compartment 2. A vertical plate 12 extends upwardly from the barrier 10 between the opposite side walls of the circuit breaker compartment. The plate 12 carries three circuit breaker disconnecting terminals of a construction which will be more fully described as this description proceeds.

The rear wall 17 of the circuit breaker compartment extends above the top of the side walls thereof and constitutes also the rear wall of the busbar compartment. An angle iron strip, attached to the top edge of the rear wall 17, acts as a support for the cover plate for the busbar compartment.

The busbar compartment comprises a hollow trough having top, bottom, front and rear walls, but no side walls, so that by placing adjacent cells in abutment with one another the troughs forming the respective busbar compartments are in alignment and constitute one long trough through which the busbars extend. There are three busbars, one for each phase, as indicated at 18, 19 and 20 respectively. The busbars are supported by insulators.

The rear wall 17 of the circuit breaker compartment has a slightly forward projecting plate 17' secured thereto, which plate carries three circuit breaker disconnecting terminals 21, mounted in horizontal alignment. The switch terminals are of a construction such as is illustrated in Figure 3, to which reference will be had as this description proceeds. For the present it is sufficient here to state that the terminals include a stationary contact that is adapted to receive a cooperating contact making member carried by the movable circuit breaker structure when the circuit breaker is brought into proper position in the compartment. The two cooperating terminals constitute a circuit breaker disconnecting switch.

Three circuit breaker disconnecting terminals which are of the same construction as the terminals 21, and housed within insulating tubes 25, are mounted in horizontal spaced alignment on the plate 12 at the forward end of the circuit breaker compartment. The stationary contacts of these switch terminals are continuations of copper bars or straps that extend to the respective busbars.

A description will now be given of the movable structure which includes the circuit breaker. The circuit breaker is indicated at 28 and is mounted on a wheeled support 29, having wheels 30. The wheels are of the ordinary trackless type, so that the breaker can be wheeled into and out of its cell and wheeled on the ground to any desired place. The circuit breaker head includes a rectangular flange 32 at the juncture between the head and the tank. The wheeled support 31 is secured to this flange. A housing 33 is also secured to this flange and extends upwardly therefrom. This housing carries the movable circuit breaker disconnecting switch terminals, and includes side walls 34—34, a rear wall 35, and a front wall 36. The front wall 36 has a suitable opening therein through which the circuit breaker operating mechanism 37 projects. The upper front portion of the housing 33 terminates somewhat above the insulating barrier 10 at a box-like structure 38 which includes a bottom 39, a front 40, a top 41 and side walls 42.

The circuit breaker disconnecting switch terminals for one set of poles of the breaker are mounted on the housing 33 in a manner illustrated more fully in Figures 3, 4 and 5. For this purpose an angle iron cross bar 45 extends between the side walls 42—42 of the housing and is welded or otherwise suitably secured thereto. A disconnecting switch contact carrying plate or carriage 47 is supported by a pair of springs 48—48 (Fig. 5) on a pair of bolts 49—49 that extend through oval holes 50—50 in the top 41 of the housing 33 and corresponding oval holes 51—51 in the horizontal flange 52 of the angle iron cross bar 45. The plate 47 is provided, at its opposite ends, with suitable sleeves 54 bolted or otherwise rigidly secured to the plate 47 and through which the bolts 49 extend. The plate 47 has three holes therein, one for each phase, at each of which holes a circuit breaker disconnecting switch contact making member is mounted. This member includes an insulating tube 56 that extends through the hole in the plate 47 and is clamped in place by means of a pair of clamping plates 58—58 that are secured to the plate 47 and are bolted together by bolts 59 to firmly grip the tube 56. The tube 56 is rigid with respect to the plate 47 and is moved by said plate as the plate is moved up, down or sideways, in a manner to be more fully set forth as this description proceeds. The plate 47 is, in addition, provided with two guilding holes 60—60 to receive guiding dowel pins 61—61 that are rigidly secured to the plate 12 of the cell structure and serve to guide the plate 47 into proper alignment as the circuit breaker is moved into its operative position, in a manner to be more fully set forth.

A laminated conductor 65 is secured to the terminal of the circuit breaker and is suitably insulated by a wrapping of insulating tape or the like 66, and extends first forwardly of the circuit breaker bushing, then upwardly and rearwardly into and through the insulating tube 56, as may be seen from Figures 1 and 3.

Figure 2:
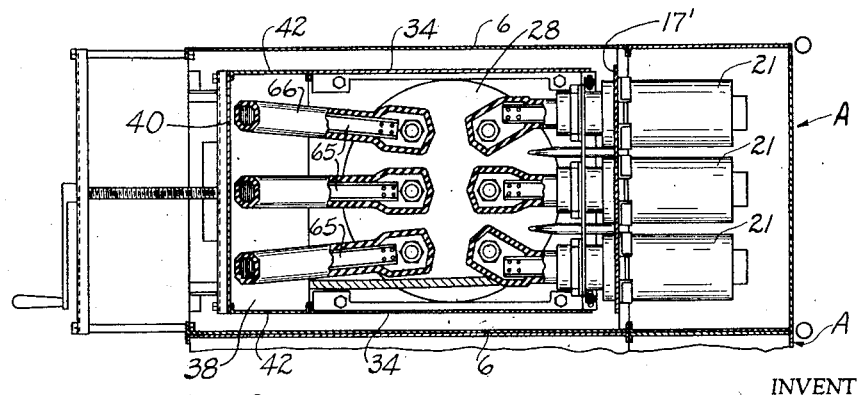
Figure 2 is a sectional view taken along the line 2—2 of Figure 1.

It is to be noted that the leads from the three poles on one side of the circuit breaker are divergent, as indicated in Figure 2, so that the center to center spacing of the corresponding disconnecting switch terminals is greater than the center to center spacing of the circuit breaker bushings. The conductor 65 consists of a large number of exceedingly thin laminations or strips of copper or other high conducting material. Each lamina is of a thickness in the neighborhood of 0.005 inch, so that the stack of laminations as well as each lamina is exceedingly flexible. The stack of laminations extends through a ring 67 and is separated into two halves by means of a cross bar 68 that is secured to the ring 67 and maintains the two groups of laminations separate from one another. The ring 67 is loose in a peripheral groove in the tube 56 so that it has a limited freedom of radial movement, and it is held against retraction by an insulating ring 67' secured in the tube 56. At the end of each group of laminations 69—69 there is provided a series of contact studs 71. These studs are secured to the laminations in any desired manner, preferably by first clamping the group of laminations 69 together, drilling the stack and tapping it, then heating the same and coating the threaded interior of the hole with solder or molten tin and threading the contact stud 71 therethrough while the entire assembly is hot. As the solder cools it establishes a firm contact between the individual laminae and the contact stud. The outer or contacting end of each contact stud may be coated with silver or other metal of high electrical conductivity. In the structure here illustrated there are 12 contact studs, arranged six in each group of laminations 69, the six contact studs being in two rows of three contact studs each. Keeper bars 74 and 75 are secured to the ring 67 above and below the laminations 69 and are secured together at their rearward end by a screw 76. Six coiled springs 77 are provided, one between each pair of contact studs on opposite stacks 69, which springs constantly force the stacks of laminations 69 outwardly against the keepers 74—75. The keepers are provided with slightly oversized holes through which the contact studs 71 slide freely. The stack of laminations 69 is of sufficient flexibility between adjacent contact studs 71 to permit flexing of the stack between the contact studs so that each contact stud maintains its individual pressure against the stationary switch contact.

Each stationary switch contact is housed within the tube of insulation 25 that is secured to the plate 12 by suitable clamping plates 58'—58' of a construction similar to the plates 58 previously described. The tube 25 is open at its forward end to receive the contact making member, and at its rear end supports a pair of stationary contact prongs 80—80 by means of brackets 81—81 that are secured in the rear end of the tube 25. These contact prongs 80—80 are continuations of copper straps 82—82 that extend to the corresponding busbars. The forward ends of the prongs 80 are outwardly flared, as indicated at 83, to guide the contact studs 71 into position.

When the circuit breaker is out of its normal position in the cell and the switch contact studs 71 are not in engagement with the contact prongs 80—80, the springs 77 maintain the stacks of laminations 69—69 outwardly pressed in engagement with the keepers 74—75, which limit the spread of the groups 69 of laminations. As the circuit breaker is moved towards its closed position the tapered ends of the guiding pins 61—61 that are secured to the stationary structure first enter the guiding holes 60—60 in the plate 47. Upon continued movement of the circuit breaker towards its operative position the pins guide the plate up or down, or sideways, to bring the set of movable contacts into alignment with the set of stationary contacts. Thus when the first contact stud engages the prongs 80—80 the cooperating contacts are substantially in alignment. The groups of laminations 69 of each disconnecting contact are capable of individual aligning movement due to the small amount of freedom of movement of the ring 67 in the tube 56. Thus if the movable contact structure for one pole is slightly out of alignment with the stationary structure the studs 71 engage the outwardly flared ends 83 which serve to guide the movable structure into accurate alignment with the stationary structure. This accurate aligning movement takes place by movement of the ring 67 together with the keepers 74—75 which move the contacting structure small amounts to effect accurate alignment of the movable with the stationary structure.

From the above description it is apparent that I have provided a switchgear which eliminates the necessity for an elevating and lowering device for the oil circuit breaker by utilizing the horizontal drawout principle of isolating the oil circuit breaker from its circuit connections. The oil circuit breaker is supported in a simple rectangular frame which rests on the floor plate of the cell by a system of mounting which permits the oil circuit breaker to be connected to or disconnected from its circuit leads by rolling it along on its own wheels. The arrangement is such that the need for an extremely accurate machining job is obviated since the disconnecting switch contacts mounted on the movable structure will be guided into proper alignment with the corresponding stationary contacts even though the circuit breaker is not accurately positioned in the cell. Also the respective contacts for the three phases on the movable structure do not have to be spaced from one another with extreme precision to correspond to the spacing of the corresponding contacts on the stationary structure since there is provided means for effecting alignment of the individual cooperating contacts in addition to the means for effecting group alignment.

The fact that the oil circuit breaker is supported on the floor, in the manner described above, results in elimination of the need for providing a skeleton of structural steel for the stationary housing. A housing of sheet metal has sufficient strength and rigidity to support the physical load since the load to be supported consists essentially of the busbars and their supports, some of the disconnecting switch contacts, and the comparatively light metering or controlling equipment.

Since alignment between the movable contact and the stationary structure is independent of the alignment of the oil circuit breaker in the movable structure, one design of movable circuit breaker supporting structure can be used to house any one of several different designs of oil circuit breakers.

The device which moves the oil circuit breaker into and out of position, and the interlocking arrangement for preventing in or out movement unless and until the circuit breaker has been operated to its open position, is shown and described more fully in my pending application, Serial No. 117,827, to which reference may be had. This also applies to the venting means for the circuit breaker.

In the embodiment of the present invention thus far described all three disconnecting switch contacts for one side of the breaker are moved in unison to bring them into proper alignment with the stationary contacts, and thereafter the respective circuit breaker disconnecting contacts are given individual fine adjustments for effecting proper alignment. If desired the arrangement may be such that the three circuit breaker disconnecting switch contacts are each individually adjusted to bring them into proper alignment with the busbar contact as the circuit breaker moves towards its normal operative position. Such an arrangement is illustrated in Figures 8, 9 and 10. In Figure 8 I have illustrated one set of cooperating disconnecting switch contacts including the contact making structure that is connected to move with the circuit breaker, and the busbar contact that is a part of the stationary structure. Insofar as the structure of Figure 8 embodies the structure previously described the same reference numerals are used. In this connection the top wall of the wheeled structure including the circuit breaker housing 33 is indicated by the reference numeral 41 as in Figure 1. A plate 47' is rigidly secured to the housing 33 that carries the circuit breaker, said plate 47' supporting the three circuit breaker disconnecting switch contacts for one side of the breaker. A disconnecting switch comprises a stationary contact 80' that is connected to the corresponding busbar by means of a strap or the like connection 82' in a manner similar to that shown in Figure 1. The contact 80' is mounted within an insulating tube 25' that is bolted or otherwise rigidly secured to the wall 12 of the busbar compartment. The tube is secured in place by a split metal ring 101—102 which is bolted to the wall 12 and tightly embraces the tube 25', thus firmly holding the same in place. The movable contact structure is mounted at the end of a conductor 104 that is encased in a wrapping or tube of insulation 105 and suitably secured to the wall 47' of the movable circuit breaker supporting structure and extending to one pole of the circuit breaker in a manner like that illustrated in Figure 1. The movable contact 106 comprises a copper tube 107, slitted longitudinally in a number of places 108 to form a plurality of fingers, in this instance eight in number, indicated at 109. The fingers are outwardly flared at their contact making end to guide the same over the tapered contact finger 80', and are pressed towards one another into firm pressure contact with the finger 80' by a plurality of coiled springs 110 which surround the eight contact fingers 109 adjacent their outer end. The copper tube 107 is threaded into a circular plate 111, which in turn is threaded into a collar 112. The collar 112 floats about the center of the conductor 104, being held by four radially extending coiled springs 114 that extend from the collar to a ring 115 that embraces a stud 116 threaded into a retaining copper tip 117 that is mounted at the end of the conductor 104. The springs 114 retain the collar 112, and therefore the contact fingers 109, centered with respect to the center line of the conductor 104, while permitting lateral movement of the contact fingers with respect to the conductor 104. A disc 118, threaded into the collar 112, and having an opening appreciably larger than the diameter of the stud 116, limits the extent of lateral movement of the collar 112 with respect to the center line of the conductor 104 to an amount, in this instance, approximately 3/8 inch in each direction. A disc 119, threaded to the forward end of the stud 116 prevents escape of the collar 112 from the conductor 104 and thus prevents the contact 106 from being pulled off of the stud 116. A plurality of flexible jumpers 121, in this instance eight in number, are welded at one end to the ring 112 and at the other end to the copper tube 117, thus eliminating all sliding current carrying connections between the conductor 104 and the contact member 106.

When the movable structure is away from the stationary structure, that is, the contact making member 106 is outside of the insulating tube 25', the collar 112 is centered on its support by the springs 114. If, on approaching the tube 25' on the stationary structure, the conductor 104 is not concentric with the tube 25', the contacting ring 112 is guided by the tapered forward end of the insulating tube 25' into concentricity with the contacting stud or finger 80' in the insulating tube 25'. It will be noted that the point of application of the forces which center the contacting ring 112 in the insulating tube 25' are so located that they set up a true sliding action and hence the frictional resistance between the sliding surfaces are much less than they would be if the centering forces were applied against the fingers of the contacting tube 107 by the stud 80' within the insulating tube. Not until the movable structure is practically centered within the tube 25' does the stud or contact making finger 80' take over and complete the guiding function. Thus, even if the contact making member of the movable structure is out of alignment with the contact stud in the stationary structure by as much as plus or minus 3/8 inch, in this particular construction, perfect contact is made.

The construction of the switchgear above described is such that it is possible to effect substantial savings in the manufacture of the same by reducing the amount of precision construction necessary and by the provision of a structure wherein the small amount of precision construction that is necessary may be facilitated. Heretofore, in switchgear of the type wherein the circuit breaker is movable into and out of its cell to effect the circuit breaker disconnecting action, it was essential that the stationary and the movable disconnecting switch contacts be accurately aligned, which required precision workmanship in the construction of the movable structure and in the construction of the stationary structure both as to the location of the respective cooperating disconnecting switch contacts and as to the location of the movable structure within the stationary structure. By the present invention the need of such accurately constructed parts is obviated. For instance, the stationary structure may be made with only the ordinary degree of accuracy common in sheet metal work. Before the plate 12 (Fig. 1) is mounted in the stationary structure it is placed in a suitable holding fixture and the tubes 25 for the three phase, and the associated contact holding means, are mounted in place being loosely clamped to permit relative adjustments of their positions. Thereafter, by means of a template or the like, their positions are accurately adjusted with respect to one another and they are rigidly clamped in place on the plate. Likewise the carriage plate 47 may be mounted in a suitable holding fixture and then the tubes 56 first loosely mounted therein and then adjusted with respect to one another to provide accurate relative positioning of the same and then the bolts for clamping the tubes to the carriage 47 are tightened. Thus only the plate 12 and the carriage 47 require accurate positioning of the parts carried thereby and such accurate positioning can be effected in the factory before the plate 27 or the carriage 47 is mounted in place in the switchgear structure. Thereafter the plate 12 is mounted in the stationary structure, no extreme accuracy of positioning being required, and the carriage 47 is mounted on its bolts 49 in the movable structure, no extreme accuracy of positioning of the carriage on the movable structure being required. The same process is carried out with respect to the stationary contacts on the plate 17' and the cooperating movable contacts carried by the circuit breaker structure. It is to be noted that the few parts where extreme accuracy of workmanship, location and interfitting of parts are necessary, that work can be done at the workbench before those parts are mounted respectively on the stationary switchgear structure or on the movable switchgear structure and that the mounting of the plates 12 or 17' and the corresponding carriages, which carry the accurately positioned parts, does not of itself require precision workmanship as any slight differences in positions of those parts is immaterial because of the floating support for the carriage 47, previously described. The same is true of the structure illustrated in Figure 8, since the positioning of the conductor 184 with respect to the plate 47' need not be effected with extreme accuracy since the contact making structure is carried thereby by means which permits a floating movement to effect alignment of the parts.

In compliance with the requirements of the patent statutes I have here shown and described a few preferred embodiments of my invention. It is, however, to be understood that the invention is not limited to the precise constructions here shown, the same being merely illustrative of the principles of the invention.

What I consider new and desire to secure by Letters Patent is:

1. A three-phase switch for establishing three-phase circuit connections between a stationary structure and a comparatively massive movable structure that is moved into and out of circuit establishing position with respect to the stationary structure, said switch including a group of three contact members, one for each phase, mounted on the stationary structure and a group of three contact making members mounted on the movable structure and movable into engagement with the respective contact members, a floating support mounted on one of the structures and supporting one of said groups of members to permit free floating movement of said group of members in unison, and means for guiding the floating support to bring the cooperating members of the groups into alignment as the movable structure is moved towards circuit establishing position with respect to the stationary structure.

2. A three-phase switch for establishing three-phase circuit connections between a stationary structure and a comparatively massive movable structure that is moved into and out of circuit establishing position with respect to the stationary structure, said switch including a group of three contact members, one for each phase, mounted on the stationary structure and a group of three contact making members mounted on the movable structure and movable into engagement with the respective contact members, a floating support mounted on the movable structure and supporting the three contact making members to permit free floating movement of said group of contact making members in unison, and means for guiding the floating support to bring the cooperating members of the groups into alignment as the movable structure is moved towards circuit establishing position with respect to the stationary structure.

3. A movable circuit breaker assembly including a group of external switch contacts extending therefrom, said assembly including circuit breaker bushings and connections from the contacts through the bushings, said contacts being insulated from each other and fixed against switch operating movement with respect to the breaker assembly, and said assembly being movable to establish and interrupt circuit connections to the breaker assembly through the switch contacts, a stationary structure into which the circuit breaker assembly is movable, said structure including switch contacts insulated from one another and engaged by the first mentioned contacts by movement of the circuit breaker assembly into position in said stationary structure, means common to all the contacts for approximately aligning the cooperating contacts as they approach one another and before they engage, and means individual to certain of the contacts for effecting a fine alignment of cooperating contacts.

4. A trackless movable circuit breaker assembly including a set of external switch contacts extending therefrom, said assembly including circuit breaker bushings and connections from the contacts through the bushings, said contacts being insulated from one another and fixed against switch operating movement with respect to the breaker assembly, and said assembly being movable to establish and interrupt circuit connections to the breaker assembly through the switch contacts, a stationary structure into which the circuit breaker assembly is movable, said structure including a set of switch contacts engaged by the first mentioned contacts by movement of the circuit breaker assembly into position in said stationary structure, at least one of said sets of switch contacts including a floating support carrying all of the contacts of that one set, and means for guiding said floating support to bring its set of switch contacts into alignment with the other set of contacts as the contacts approach one another and before they engage one another.

5. A movable circuit breaker assembly including external switch contact making members extending therefrom, said assembly including circuit breaker bushings and connections from the contacts through the bushings, spring means for maintaining a pressure engagement of the members when they establish switching connections, said contacts being fixed against switch operating movement with respect to the breaker assembly but mounted by means including a spring support separate from said spring means to permit free floating adjusting movement of the contact making member and the spring means, and said assembly being movable horizontally to establish and interrupt circuit connections to the breaker assembly through the contact making members.

6. In combination, a structure including a set of disconnecting contacts, and a comparatively massive assembly movable with respect to said structure and including a set of disconnecting contacts insulated from one another and adapted to engage the first mentioned contacts by movement of the assembly, characterized by the facts that there is provided a floating spring support for at least one of the sets of contacts for adjusting all of the contacts of that set in unison with respect to the contacts of the other set, said support being so constructed and arranged as to permit adjusting movement of said spring supported set of contacts at right angles to the direction of circuit closing movement of the contacts, and there is provided means effective within predetermined limits of misalignment of the contacts for guiding the support to bring its set of contacts into alignment with the other set of contacts as the assembly is moved towards its circuit establishing position with respect to the structure and before the contacts come into engagement, whereby proper engagement is obtained between the contacts even when the contacts on the assembly are initially out of alignment with the contacts on the structure within said predetermined limits.

7. In combination, a structure including a set of disconnecting contacts, and a comparatively massive assembly movable with respect to said structure and including a set of disconnecting contacts insulated from one another and adapted to engage the first mentioned contacts by movement of the assembly, characterized by the facts that there is provided a floating spring support for at least one of the sets of contacts for adjusting all of the contacts of that set in unison with respect to the contacts of the other set, said support being so constructed and arranged as to permit adjusting movement of said spring supported set of contacts at right angles to the direction of circuit closing movement of the contacts, and there is provided means for guiding the support to bring its set of contacts into alignment with the other set of contacts as the assembly is moved towards its circuit establishing position with respect to the structure and before the contacts come into engagement, whereby proper engagement is obtained between the contacts even when the contacts on the assembly are initially out of alignment with the contacts on the structure, and means associated with at least one of the contacts of each pair of cooperating contacts of the two sets for effecting individual aligning adjustment of the engaging contacts.

8. Switchgear comprising a stationary structure including means forming a circuit breaker compartment, a set of circuit breaker disconnecting contacts carried by said structure and accessible for engagement from within the compartment, a movable structure within the compartment and carrying a cooperating set of contacts movable into and out of engagement with corresponding ones of the first mentioned contacts by bodily movement of the movable structure within the stationary structure, characterized by the facts that there is provided a floating support on one of said structures supporting all of the contacts of one of said sets of contacts and movable for simultaneous adjustment of all the contacts of that set of floating contacts and there is provided means for guiding the floating contact support to bring its set of contacts into alignment with the other set of contacts as the contacts approach one another and before they engage one another.

9. Switchgear comprising a stationary structure including means forming a circuit breaker compartment, a set of circuit breaker disconnecting contacts carried by said structure and accessible for engagement from within the compartment, a movable structure within the compartment and carrying a cooperating set of contacts insulated from one another and movable into and out of engagement with the corresponding ones of the first mentioned contacts by bodily movement of the movable structure within the stationary structure, characterized by the fact that there is provided a floating support on one of said structures supporting all of the contacts of one of said sets of contacts and movable for simultaneous adjustment of all of the contacts of the set of floating contacts into alignment with the other set of contacts as the contacts approach one another and before they engage one another, an enclosed circuit breaker unit carried by said movable structure, and connections between terminals of the circuit breaker and the contacts of the movable structure, whereby movement of the movable structure establishes circuit connections to the breaker.

10. In combination, a circuit breaker, a supporting structure for the breaker, said structure having wheels at the bottom thereof for rolling on the floor, a disconnecting switch support mounted on the structure by means permitting free aligning movement of the support on the structure within predetermined limits and including support centering springs, a plurality of circuit breaker disconnecting switch contacts insulated from one another and carried by said disconnect switch support and adapted to be brought into and out of operative position by bodily movement of the wheeled structure, and connections between the disconnecting switch contacts and the terminals of the circuit breaker.

11. A polyphase electric switching apparatus comprising a sheet metal circuit breaker compartment, the rear wall on the interior of the compartment being stepped forward adjacent the top of the compartment, a set of horizontally disposed tubular contact housings, one for each phase, mounted in said forwardly stepped rear wall and opening on the inside of the compartment for receiving a horizontally movable contact making member, a contact in each of said housings, connections to said contacts, a second set of tubular contact housings, one for each phase, mounted in and extending through the rearward part of the rear wall of the compartment and also opening into the compartment, a switch contact in each of said second tubular housings, a polyphase circuit breaker structure in said compartment and movable horizontally forward and backward in the compartment, two sets of switching means on said circuit breaker structure and terminating in horizontally disposed contact making members, said contact making members being moved into and out of engagement with the corresponding contacts in the tubular housings by horizontal movement of the circuit breaker structure in the compartment, and means for moving cooperating contacts and contact making members of all phases into alignment in unison as the circuit breaker moves in its compartment, said last means including a spring mounted support for a plurality of contacts one contact for each phase.

12. In combination with a circuit breaker, a contact making structure comprising an insulating tube, means for securing said tube and breaker together for joint movement, said means including means providing a floating support for the tube with respect to the breaker, a flexible conductor joined at one end to a terminal of the circuit breaker and extending through said tube and having switch contact making means at its opposite end, and means for supporting the conductor in the tube while permitting freedom of limited movement thereof radially of the tube.

13. In combination with a circuit breaker, a contact making structure comprising an insulating tube, means including a spring support for securing said tube and breaker together for joint movement while allowing a predetermined movement of the spring support with respect to the breaker for adjusting the position of the tube, a flexible conductor joined at one end to a terminal of the circuit breaker and extending through the tube and having switch contact making means at its opposite end, and means for supporting the conductor in the tube and permitting a freedom of limited movement thereof radially of the tube.

14. In combination with a circuit breaker, a contact making structure comprising a laminated flexible conductor secured at one end to a terminal of the circuit breaker and having switch contact making means at its other end, means for supporting said conductor with respect to the breaker adjacent the contact making end of the conductor so that the contact making means is moved into and out of circuit making position by bodily movement of the circuit breaker while permitting a limited free movement of the contact making means with respect to the breaker, said contact making means comprising contact studs extending through and secured to the laminations, and individual spring backing means for the respective studs, said laminated conductor being sufficiently flexible between adjacent studs to permit independent aligning movement of the respective studs.

15. In combination with a circuit breaker, a contact making structure comprising a laminated flexible conductor secured at one end to a terminal of the circuit breaker and having switch contact making means at its other end, means for supporting said conductor with respect to the breaker adjacent the contact making end of the conductor so that the contact making means is moved into and out of circuit making position by bodily movement of the circuit breaker while permitting a limited free movement of the contact making means with respect to the breaker, said contact making means comprising contact studs extending through and secured to the laminations, and individual spring backing means for the respective studs, said laminated conductor being sufficiently flexible between adjacent studs to permit independent aligning movement of the respective studs, the means for supporting the conductor with respect to the breaker including holding means around the contact making end of the conductor and having holes therein through which the contact studs fit snugly and are slideable, and means securing the holding means to the breaker structure.

16. The method of making a switchgear of the type including a stationary structure and a separate movable circuit breaker structure of the type having cooperating disconnecting switch contacts brought into and out of cooperating engagement by bodily movement of the circuit breaker structure with respect to the stationary structure, which comprises, fabricating the two structures exclusive of the contacts to a degree of accuracy substantially less than that required for proper electrical engagement of moving parts, mounting sets of contact structures on plates with the contacts of each set spaced from one another with a higher degree of accuracy than the accuracy of construction of the two structures, then mounting the plates on the structure in approximate aligning relation of the contacts, and providing a spring support for at least one set of plates.

17. A switchgear of the type including a stationary structure having a group of disconnecting switch contacts and a movable structure movable thereinto and including a circuit breaker and a group of circuit breaker disconnecting switch contacts movable into and out of engagement with the first mentioned contacts by movement of the movable structure, a floating support for one of said groups of contacts, and means responsive to the movement of the movable structure towards its operative position for moving the floating support into position to bring all of the associated contacts of the two groups into alignment.

18. A switchgear of the type including a stationary structure having a group of disconnecting switch contacts and a movable structure movable thereinto and including a circuit breaker and groups of circuit breaker disconnecting switch contacts movable into and out of engagement with the first mentioned contacts by movement of the movable structure, a floating support for one of said groups of contacts, and means responsive to the movement of the movable structure towards its operative position for moving the floating support into position to bring all of the associated contacts of the two groups into alignment, said means being separate from the contacts.

ALLEN M. ROSSMAN.